United States Patent
Kimura et al.

(10) Patent No.: US 6,408,707 B1
(45) Date of Patent: Jun. 25, 2002

(54) BEVEL GEAR MECHANISM AND ELECTRIC POWER STEERING SYSTEM USING IT

(75) Inventors: Yukihide Kimura; Hideo Osanai, both of Susono; Kei Takakuwa, Chiryu; Yoshikazu Kameda; Norihiro Yoshida, both of Susono; Yoshimi Kajitani, Toyota; Naohito Ino, Anjo; Katsutoshi Mizuno, Handa; Takatomo Kutsuna, Anjo, all of (JP)

(73) Assignees: Toyota Jidosha Kabushiki Kaisha, Toyota; Nissei Corporation, Anjo, both of (JP)

( * ) Notice: Subject to any disclaimer, the term of this patent is extended or adjusted under 35 U.S.C. 154(b) by 0 days.

(21) Appl. No.: 09/709,719

(22) Filed: Nov. 13, 2000

(30) Foreign Application Priority Data

Nov. 30, 1999 (JP) ............................. 11-340539

(51) Int. Cl.[7] ............................................. F16H 55/18
(52) U.S. Cl. ..................... 74/409; 74/388 PS; 74/420
(58) Field of Search ..................... 74/416, 417, 411, 74/409, 422, 424.5, 458, 461, 443, 388 PS, 420; 180/443, 444, 446

(56) References Cited

U.S. PATENT DOCUMENTS 5,257,543 A * 11/1993 Fogelberg .................... 74/440
5,829,306 A * 11/1998 Komazaki et al. ............ 74/411
6,170,349 B1 * 1/2001 Tanaka et al. ................ 74/409

FOREIGN PATENT DOCUMENTS

| JP | 59-80563 | * 5/1984 | ........... F16H/55/18 |
|----|----------|----------|----------------------|
| JP | 07-232651 | 2/1994 | |
| JP | 11-118001 | 10/1997 | |
| JP | 11-182636 | 12/1997 | |

OTHER PUBLICATIONS

U.S.patent application Ser. No. 09/168,942, Hiroaki filed Oct. 09, 1998.

* cited by examiner

*Primary Examiner*—David A. Bucci
*Assistant Examiner*—Timothy McAnulty
(74) *Attorney, Agent, or Firm*—Oliff & Berridge, PLC

(57) ABSTRACT

A plate spring body (support member) elastically supports an inner gear (second bevel gear) relative to an outer gear (first bevel gear). Ring springs (fluctuation suppressing member) are further provided to reinforce the elastic support, so as to suppress fluctuation of the inner gear along a direction nearly perpendicular to an axis connecting the center of rotation of the outer gear and contact part with a hypoid pinion gear (third bevel gear).

7 Claims, 6 Drawing Sheets

BEVEL GEAR MECHANISM AND ELECTRIC POWER STEERING SYSTEM USING IT

BACKGROUND OF THE INVENTION

1. Field of the Invention

The present invention relates to bevel gear mechanisms in a broad sense, including bevel gears in a strict sense, skew bevel gears, hypoid gears, etc., and to an electric power steering system using it.

2. Related Background Art

Such bevel gear mechanisms are used, for example, in the electric power steering systems and the like, and one of conventionally known configurations is a hypoid gear mechanism. The electric power steering system with the hypoid gear mechanism is provided with a hypoid pinion gear fixed to a rotational shaft of a driving motor and a hypoid ring gear fixed to a steering shaft, and the two gears are in mesh with each other in such a positional relation that their rotation axes are not parallel to each other and do not intersect with each other. This mechanism supplies a driving force of the driving motor as steering assistance to the steering shaft.

SUMMARY OF THE INVENTION

In such bevel gear mechanisms, it is also necessary to provide appropriate backlash for contact portions of the two gears in order to prevent seizure and breakage of tooth flanks. With too large backlash, it can result in noise such as gear jamming sound or the like. For example, Japanese Patent Application Laid-Open No. H07-232651 discloses a mechanism capable of adjusting the mount position of the hypoid ring gear relative to the steering shaft up and down along the axial direction, and this adjustment of the mount position leads to adjustment of magnitude of the backlash. Even with appropriate backlash, however, for example, where a moment of inertia is large on the hypoid pinion gear side including the driving motor, the noise such as gear jamming sound will occur readily at the contact portions of the bevel gear mechanism if the driving motor is actuated because of input from the tire side due to road undulations or the like (input of disturbance).

The present invention has been accomplished in order to solve this problem and an object of the invention is thus to provide a bevel gear mechanism that can more effectively reduce the noise such as gear jamming sound occurring at the contact portions of the bevel gear mechanism, and an electric power steering system using it.

In order to accomplish the above object, a bevel gear mechanism according to the present invention is constructed in structure comprising a first bevel gear of a ring shape having teeth projecting on one disk surface side; a second bevel gear of a ring shape arranged to be concentric with the first bevel gear and having teeth placed on a concentric circle basis on the same surface side as the teeth of the first bevel gear; a support member for substantially restraining rotation of the second bevel gear relative to the first bevel gear and for elastically supporting the second bevel gear relative to the first bevel gear so that in a free state the teeth of the second bevel gear can project relative to the teeth of the first bevel gear in a direction of a rotation axis and so that in a pushed state, when the teeth of the second bevel gear is pushed to the first bevel gear side in the direction of the rotation axis, the teeth of the second bevel gear can be retracted to the first bevel gear side; and a fluctuation suppressing member for suppressing fluctuation of the second bevel gear relative to the first bevel gear along a predetermined diameter direction.

Since the teeth of the second bevel gear elastically supported by the support member project relative to the teeth of the first bevel gear, when a third bevel gear described hereinafter is assembled together with the gears, the second bevel gear and the third bevel gear go in contact with each other in the assembled state and the third bevel gear pushes the second bevel gear to the first bevel gear side, whereby the second bevel gear is retracted to the first bevel gear side in the direction of the rotation axis thereof to deform the support member or the like. The second bevel gear under restoring force of the support member or the like gears with the third bevel gear while pushing it. If the third bevel gear is rotationally driven because of input from the tire side, kinetic energy of the third bevel gear at a start of rotation will be consumed by the degree of resisting the pushing force of the support member or the like, so as to reduce impact upon collision between teeth and thus suppress occurrence of gear jamming sound.

According to the results of intensive and extensive studies by the inventor, it became clear that, where the moment of inertia was large on the third bevel gear side and when the third bevel gear was rotationally driven because of the input from the tire side, the second bevel gear tended to fluctuate readily along a direction nearly perpendicular to an axis connecting the contact part of the third bevel gear and the center of rotation of the second bevel gear, with rotation of the third bevel gear. If the second bevel gear should fluctuate in this way, flexural rigidity of the support member would be insufficient and as a consequence, the consumption of energy of the third bevel gear would be insufficient at the start of rotation, which could cause the third bevel gear to collide with the first bevel gear to make noise. Therefore, the fluctuation suppressing member is provided to suppress the fluctuation of the second bevel gear along the predetermined diameter direction, which is the direction nearly perpendicular to the axis connecting the contact portion with the third bevel gear described hereinafter and the center of rotation of the second bevel gear.

The invention involves two positional relations between the first bevel gear and the second bevel gear; a relation wherein the first bevel gear is located on the inner periphery side and the second bevel gear on the outer periphery side, and a relation wherein the first bevel gear is located on the outer periphery side and the second bevel gear on the inner periphery side.

It is preferable that this fluctuation suppressing member be arranged so that a fixed end thereof is fixed to the first bevel gear while a free end thereof is in contact with at least one of the second bevel gear and the support member, thereby elastically supporting the second bevel gear and the support member relative to the first bevel gear.

This structure permits the fluctuation suppressing member to reinforce the elastic support force of the support member, which enhances torsional rigidity and flexural rigidity along the direction of fluctuation of the second bevel gear, so as to suppress the fluctuation of the second bevel gear relative to the first bevel gear. Since the elastic support force is thus enhanced, the energy upon collision can be absorbed by flexural of the support member and the fluctuation suppressing member even if the moment of inertia is large on the third bevel gear side, so that the impact is also relaxed upon collision between teeth.

In the bevel gear mechanism further comprising a third bevel gear capable of gearing with the first and second bevel gears, which has another rotation axis not parallel to that of the first and second bevel gears, the fluctuation suppressing member suppress the fluctuation of the second bevel gear along the direction nearly perpendicular to the axis connecting the center of rotation of the second bevel gear and the contact part between the second bevel gear and the third bevel gear.

In the gearing state with the bevel gear, the second bevel gear is easy to fluctuate along this direction. This tendency becomes great where the moment of inertia is large on the bevel gear side. Thus the fluctuation suppressing member mainly suppresses the fluctuation along this direction, whereby occurrence of noise is restrained while suppressing increase in rotational friction of the gear mechanism.

It is preferable herein that the fluctuation suppressing member be comprised of a pair of plate spring members holding the second bevel gear and the support member on the both sides thereof along the direction of the rotation axis of the first bevel gear.

When the fluctuation suppressing member is comprised of the pair of plate spring members to hold the second bevel gear and the support member, the torsional rigidity and flexural rigidity of the support member and the fluctuation suppressing member can be enhanced fully.

An electric power steering system according to the present invention is constructed in structure using the bevel gear mechanism of the above structure, in which the aforementioned first and second bevel gears are connected to a transmission shaft of steering force, for example, to a steering shaft, in which the third bevel gear is connected to an output shaft of an electric motor, and in which these bevel gears constitute a hypoid gear mechanism.

This electric power steering system is free of occurrence of vibration and the noise such as gear jamming sound due to the disturbance such as input from tires or the like, and provides steering feeling without anomaly.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
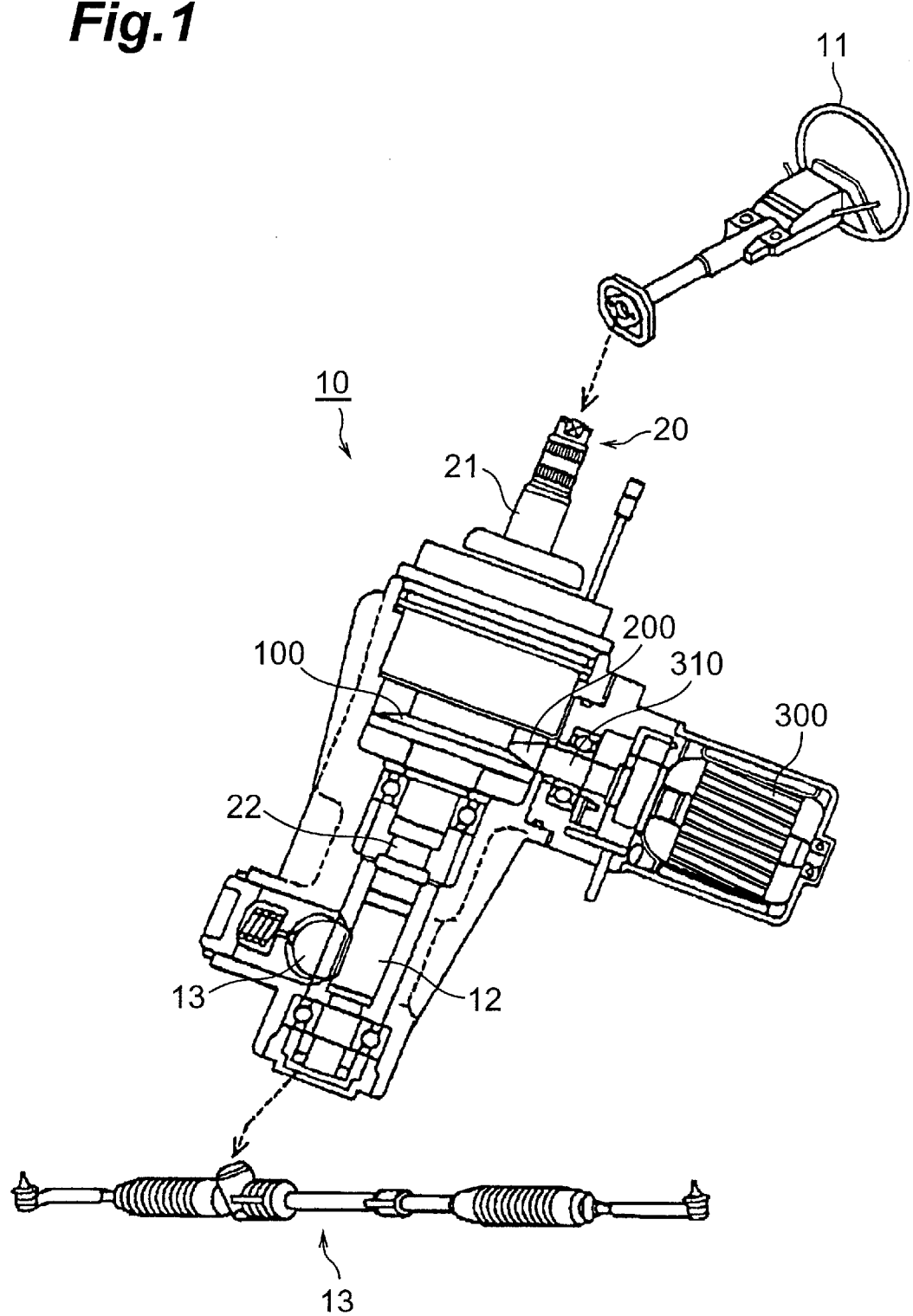
FIG. 1 is a structural diagram to show an electric power steering system according to the present invention.

The embodiments of the present invention will be described hereinafter with reference to the accompanying drawings. To facilitate the comprehension of the explanation, the same reference numerals denote the same parts, where possible, throughout the drawings, and a repeated explanation will be omitted.

FIG. 1 is a diagram to show an electric power steering system 10 according to the present invention, which is equipped with a hypoid gear mechanism as a bevel gear mechanism. The steering shaft 20 is connected at one end thereof to a steering wheel 11 and a pinion gear 12 is coaxially fixed to the other end of the steering shaft 20. A rack axle 13 gears with this pinion gear 12 so that rotary motion of the pinion gear 12 is converted to translatory motion of the rack axle 13 to turn the road wheels (not illustrated) connected to the both ends of the rack axle 13.

This steering shaft 20 is constructed in such structure that an input shaft 21 coupled to the steering wheel 11 is connected to an output shaft 22 coupled to the pinion gear 12, and a hypoid ring gear 100 is coaxially fixed to the output shaft 22. A hypoid pinion gear 200 is in mesh with this hypoid ring gear 100 and is integrally formed at an end of an output shaft 310 of an electric motor 300.

Figure 2:
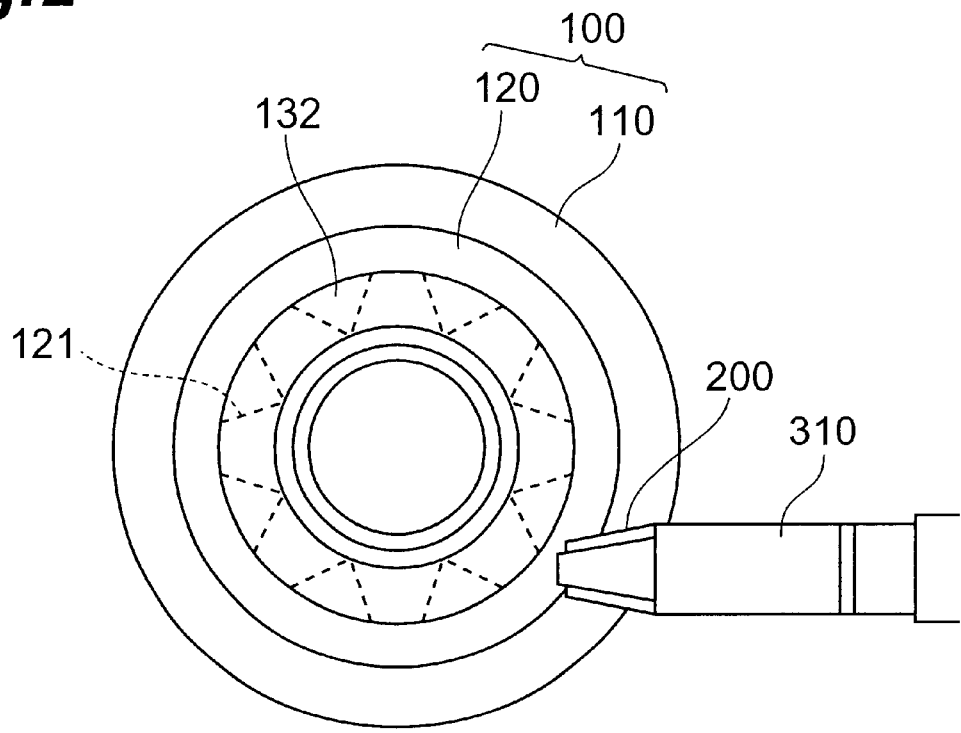
FIG. 2 is a plan view to show a hypoid gear mechanism according to the present invention, which is used in the system of FIG. 1.
Figure 3:
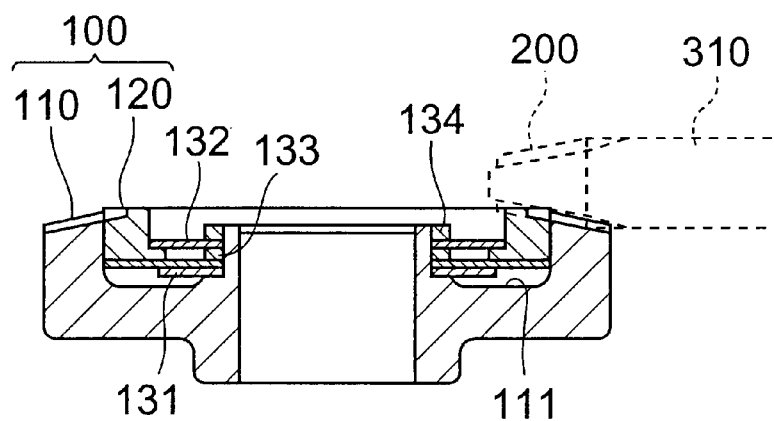
FIG. 3 is a longitudinal, cross-sectional view of the mechanism.
Figure 4:
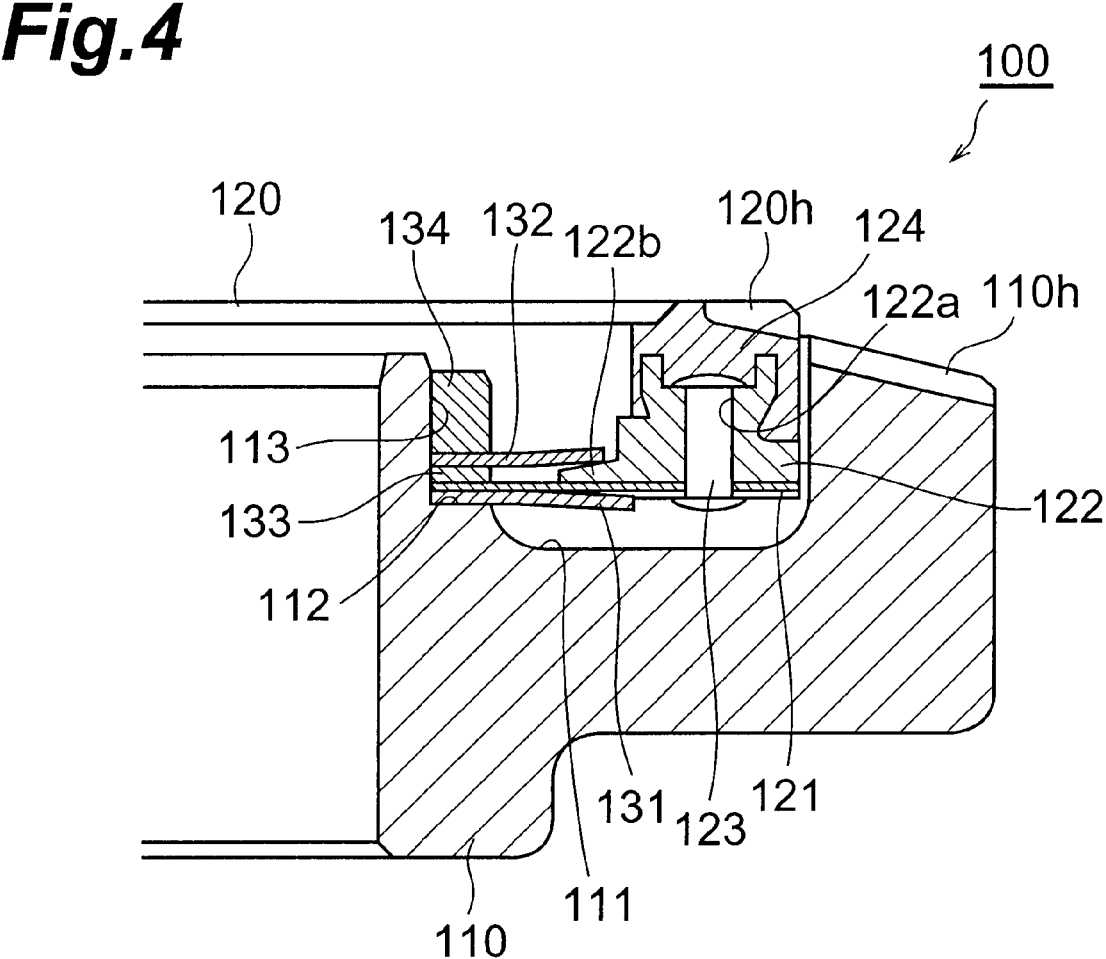
FIG. 4 is an enlarged view of one side of FIG. 3.

FIG. 2 to FIG. 4 show the part of the bevel gear mechanism comprised of the hypoid ring gear 100 and the hypoid pinion gear 200.

The hypoid ring gear 100 has an outer gear 110 as a first hypoid ring gear, which is a base part, and an inner gear 120 as a second hypoid ring gear, which is disposed in a circular recess groove 111 cut in the outer gear 110.

Figure 5:
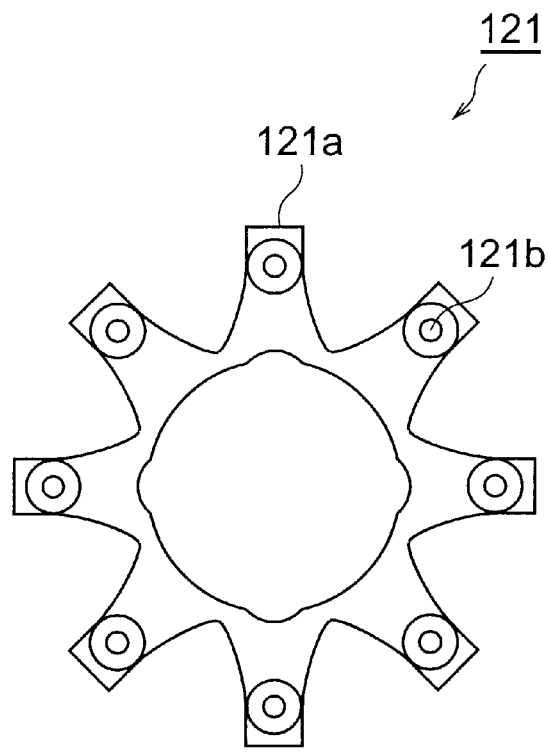
FIG. 5 is a plan view to show a plate spring body in the mechanism of FIG. 2.

The inner gear 120 is integrally formed at free ends 121a of a plate spring body 121 illustrated in FIG. 5. This plate spring body 121 has a plurality of plate springs arranged radially and the bases thereof are connected in a ring shape to be integrated.

In an example of formation of the inner gear 120, a metal seat 122 of a ring shape is first fixed onto the plate spring body 121. On this occasion, openings 121b bored at the free ends 121a of the plate spring body 121 are aligned with through holes 122a bored in the seat 122, rivets 123 are inserted into the openings 121b and through holes 122a, and the seat 122 is fixed on the plate spring body 121 by the rivets 123. Then a resin gear 124 is formed on the seat 122 by insert molding, thereby forming the inner gear 120.

For installing the inner gear 120 thus formed, into the outer gear 110, a ring spring 131 as a plate spring of a ring shape is first placed on a step 112 formed on the inner periphery side of the circular recess groove 111 in the outer gear 110, and then the inner gear 120 is put thereonto. Then a ring spacer 133 is placed and a ring spring 132 having substantially the same shape and the same property as the aforementioned ring spring 131 is further set thereon. After this, a press fit ring 134 is pressed onto a side wall portion 113 of cylindrical shape standing up from the step 112. This brings the inner gear 120, ring springs 131, 132, and spacer 133 into press contact between the press fit ring 134 and the step 112, so that each member of the inner gear 120, ring springs 131, 132, and spacer 133 is fixed on the outer gear 110 side while substantially being restrained from rotating relative to the outer gear 110. The structure on the inner gear 120 side may also be constructed so as to provide a play for tolerating some relative rotation with respect to the outer gear 110.

The hypoid ring gear 100 of this structure before mounted into the power steering system 10 is in such a state that the teeth 120h of the inner gear 120 project slightly in the direction of the rotation axis (upward in the figure) relative to the teeth 110h of the outer gear 110, as illustrated in FIG. 4. When it is mounted to bring the hypoid ring gear 100 into mesh with the hypoid pinion gear 200, the hypoid pinion gear 200 pushes the inner gear 120 down to the outer gear 110 side in the direction of the rotation axis. In this state, the inner gear 120 is in mesh with the hypoid pinion gear 200 while pushing it because of restoring force of the bent plate spring body 121 and ring springs 131, 132.

In order to allow displacement of the inner gear 120 relative to the outer gear 110, a gap of a predetermined width is provided between the outer edge of the inner gear 120 and the inner edge of the outer gear 110. The teeth 120h of the inner gear 120 are cut so that the teeth 110h of the outer gear 110 and the teeth 120h of the inner gear 120 are continuous in series (i.e., so that extensions of flanks of the two gears are approximately aligned) in the depressed state of the inner gear 120 by the hypoid pinion gear 200.

In the structure wherein the inner gear 120 elastically gears with the hypoid pinion gear 200 as described above, when the hypoid pinion gear 200 is rotationally driven because of the vibration input or the like from the tire side, the kinetic energy of the hypoid pinion gear 200 at the start of rotation is consumed by the degree of resisting the pushing force of the plate spring body 121 and the ring springs 131, 132, and thus the impact is reduced upon collision between the teeth of the hypoid ring gear 100 and the hypoid pinion gear 200, thereby suppressing occurrence of gear jamming sound.

Figure 6:
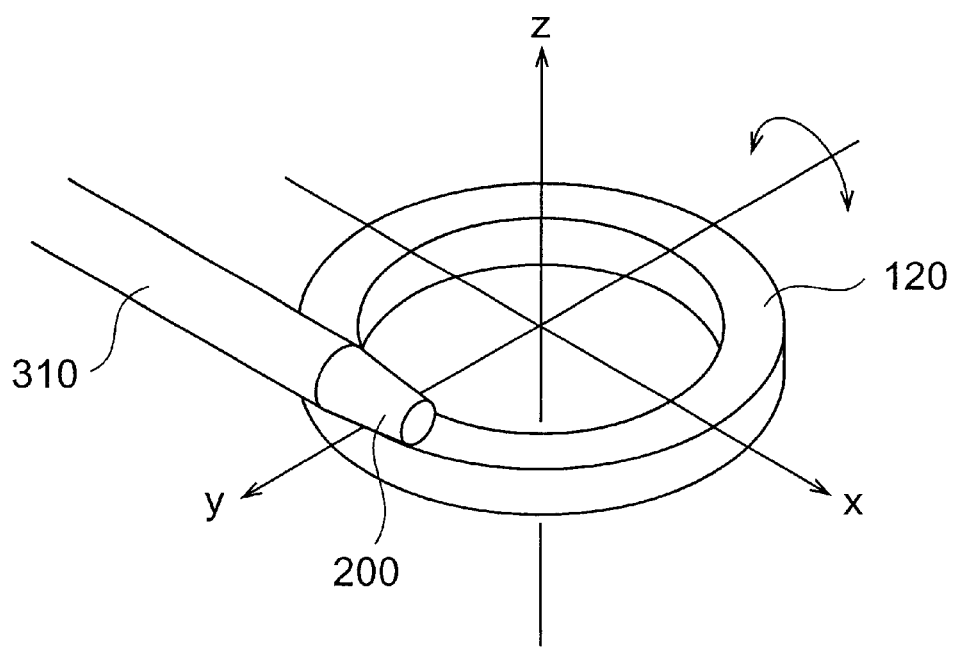
FIG. 6 is an explanatory diagram to show the fluctuation direction of an inner gear in the mechanism of FIG. 2.
Figure 7:
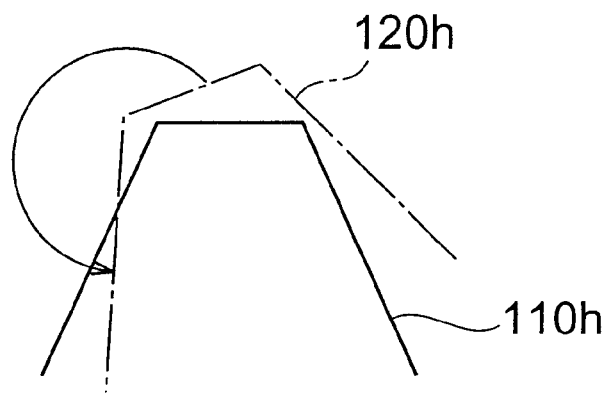
FIG. 7 is an explanatory diagram to show a situation in which the teeth of the inner gear are rocked relative to the teeth of an outer gear, with fluctuation of the inner gear.

It was found that the inner gear 120 tends to fluctuate readily with rotation of the hypoid pinion gear 200 in mesh with the inner gear 120, and the fluctuation direction thereof is a direction nearly perpendicular to the axis connecting the contact part between the inner gear 120 and the hypoid pinion gear 200 and the center of rotation of the inner gear 120 (i.e., the direction along the x-axis in FIG. 6). If the inner gear 120 should fluctuate in the direction, the teeth 120h of the inner gear 120 would be displaced so as to be tilted relative to the teeth 110h of the outer gear 110 (see FIG. 7), and thus the impact would not be absorbed well, because the inner gear 120 fails to move sufficiently along the axial direction. This would lead to a situation in which gear jamming occurs readily because of collision of the hypoid pinion gear 200 with the teeth 110h of the outer gear 110.

In this respect, the inner gear 120 is fixed on the side of the free ends 121a of the plate spring body 121 while further elastically being supported by the pair of ring springs 131, 132. Namely, referring to FIG. 4, the ring spring 131 is arranged so that the fixed end thereof on the inner periphery side is fixed to the outer gear 110 by action of the press fit ring 134 and so that the free end thereof on the outer periphery side is in contact with the lower part of the seat 122. The ring spring 132 is also arranged similarly so that the fixed end thereof on the inner periphery side is fixed to the outer gear 110 by action of the press fit ring 134 and so that the free end thereof on the outer periphery side is in contact with a taper part 122b projecting from the seat 122 toward the inside.

Therefore, the mechanism is constructed in the structure in which the elastic support force of the plate spring body 121 supporting the inner gear 120 is reinforced by the pair of ring springs 131, 132, and the torsional rigidity and flexural rigidity about the y-axis in FIG. 6 can be enhanced sufficiently concerning the inner gear 120 by the action of the plate spring body 121 and the pair of ring springs 131, 132, thereby enabling to suppress the fluctuation of the inner gear 120 with rotation of the hypoid pinion gear 200. The pushing force by the pair of ring springs 131, 132 can be uniformized by forming the part of the seat 122 pinched by the pair of ring springs 131, 132, in the taper shape (taper portion 122b).

The above showed the example of the sandwich structure of the plate spring body 121 and the inner gear 120 between the pair of ring springs 131, 132, but the structure does not have to be limited to this example; for example, it is possible to employ configurations using either the ring spring 131 or the ring spring 132. Further, the shape of the springs does not have to be limited to the ring shape, either. The springs can be formed in such structure that plate springs of sectorial shape, rectangular shape, or the like are arranged at predetermined intervals.

Figure 8:
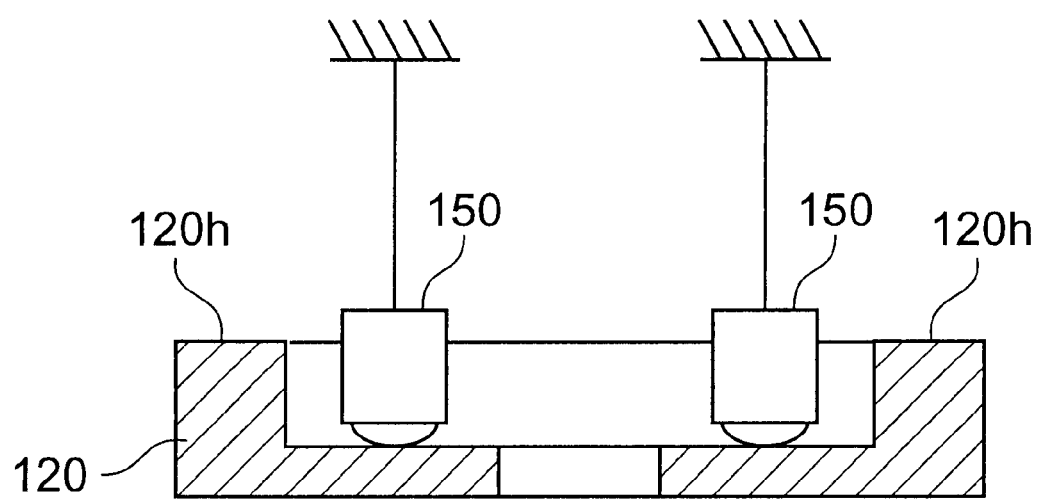
FIG. 8 is a schematic diagram to show another embodiment of the fluctuation suppressing member according to the present invention, which suppresses the fluctuation of the inner gear.

The above embodiment showed the example of the ring springs 131, 132 as the member for suppressing the fluctuation of the inner gear 120, but the fluctuation suppressing member does not have to be limited to such spring members. The fluctuation suppressing member can be any member capable of suppressing the fluctuation along the direction nearly perpendicular to the axis connecting the contact part between the inner gear 120 and the hypoid pinion gear 200, and the center of rotation of the inner gear 120. Therefore, for example as illustrated in FIG. 8, the fluctuation of the inner gear 120 along the x-axis direction can also be suppressed by placing a ball bearing 150 fixed to a predetermined stationary portion of the housing or the like, at a position along the x-axis of FIG. 6 and keeping the ball bearing 150 in contact with the inner gear 120.

Figure 9:
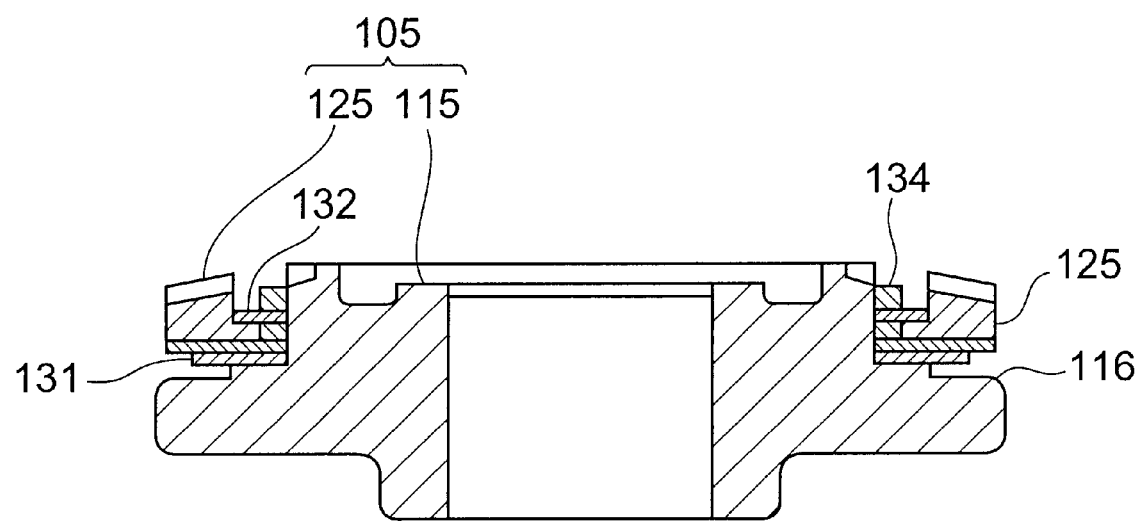
FIG. 9 is a diagram to show another configuration of the bevel gear mechanism according to the present invention.

The embodiment described above showed the example of the structure in which the second hypoid ring gear was placed as the inner gear 120 on the inner periphery side while the first hypoid ring gear was placed as the outer gear 110 on the outer periphery side, but the mechanism can also be constructed in such structure that the second hypoid ring gear is placed on the outer periphery side while the first hypoid ring gear on the inner periphery side. FIG. 9 is a diagram to show an embodiment of this structure.

In this embodiment, the inner gear 115 of the first hypoid ring gear is provided as the base part and the outer gear 125 of the second hypoid ring gear is placed on a flange 116 formed in the outer periphery of the inner gear 115, thus forming the hypoid ring gear 105.

The present embodiment is constructed in the same manner as in the embodiment of FIG. 2 to FIG. 4 in that the outer gear 125 is mounted on the inner gear 115 by use of the members of the ring springs 131, 132, spacer 133, and press fit ring 134.

The discussion about the aforementioned embodiment also applies to the relation between the first hypoid ring gear and the second hypoid ring gear in the present embodiment.

The embodiments described above showed the hypoid gear mechanisms, but the gear mechanisms of the invention are not limited to the hypoid gear mechanisms; for example, the invention can also be applied to the bevel gear mechanisms having the relation in which the rotational center axes of the two gears in mesh with each other are not parallel, such as the bevel gears or the like, with similar action and effect.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A bevel gear mechanism used for transmitting power between two axes not parallel to each other, said bevel gear mechanism comprising:

a first bevel gear of a ring shape having teeth projecting on one disk surface side;

a second bevel gear of a ring shape arranged to be concentric with said first bevel gear and having teeth placed on a concentric circle basis on the same surface side as the teeth of said first bevel gear;

a support member for substantially restraining rotation of the second bevel gear relative to said first bevel gear and for elastically supporting the second bevel gear relative to said first bevel gear so that in a free state the teeth of said second bevel gear can project relative to the teeth of said first bevel gear in a direction of a rotation axis and so that in a pushed state, when the teeth of said second bevel gear is pushed to the first bevel gear side in the direction of the rotation axis, the teeth of said second bevel gear can be retracted to the first bevel gear side; and a fluctuation suppressing member extending between the second bevel gear and the first bevel gear for suppressing fluctuation of said second bevel gear relative to said first bevel gear along a predetermined diameter direction.

2. The bevel gear mechanism according to claim 1, wherein said fluctuation suppressing member is arranged so that a fixed end thereof is fixed to said first bevel gear and so that a free end thereof is in contact with at least one of said second bevel gear and said support member, and wherein said fluctuation suppressing member elastically supports said second bevel gear and said support member relative to said first bevel gear.

3. The bevel gear mechanism according to claim 1, further comprising a third bevel gear capable of gearing with said first and second bevel gears, which has another rotation axis not parallel to that of said first and second bevel gears, wherein said fluctuation suppressing member suppresses fluctuation of the second bevel gear along a direction nearly perpendicular to an axis connecting a center of rotation of said second bevel gear and contact part between said second bevel gear and said third bevel gear.

4. The bevel gear mechanism according to claim 1, wherein said fluctuation suppressing member is comprised of a pair of plate spring members for holding said second bevel gear and support member on the both sides thereof along the direction of the rotation axis of said first bevel gear.

5. An electric power steering system for adding an assist steering force from an electric motor connected to a transmission axis of steering force, to a driver's steering force, said power steering system comprising:

a first bevel gear of a ring shape having teeth projecting on one disk surface side, a rotation axis of said first bevel gear being aligned with the transmission axis of steering force;

a second bevel gear of a ring shape arranged so as to be concentric with said first bevel gear and having teeth placed on a concentric circle basis on the same surface side as the teeth of said first bevel gear;

a third bevel gear capable of gearing with said first and second bevel gears, said third bevel gear having a rotation axis skewed to said transmission axis and connected to an output shaft of said electric motor;

a support member for substantially restraining rotation of said second bevel gear relative to said first bevel gear and for elastically supporting said second bevel gear in mesh with said third bevel gear so that in a free state the teeth of said second bevel gear can project relative to the teeth of said first bevel gear in a direction of a rotation axis and so that when the teeth of said second bevel gear is pushed by said third bevel gear the teeth of said second bevel gear can be retracted to the first bevel gear side in the direction of the rotation axis; and a fluctuation suppressing member extending between the second bevel gear and the first bevel gear for suppressing fluctuation of the second bevel gear along a direction nearly perpendicular to an axis connecting a center of rotation of said second bevel gear and contact part between said second bevel gear and said third bevel gear.

6. A bevel gear mechanism used for transmitting power between two axes not parallel to each other, said bevel gear mechanism comprising:

a first bevel gear of a ring shape having teeth projecting on one disk surface side;

a second bevel gear of a ring shape arranged to be concentric with said first bevel gear and having teeth placed on a concentric circle basis on the same surface side as the teeth of said first bevel gear;

a support member for substantially restraining rotation of the second bevel gear relative to said first bevel gear and for elastically supporting the second bevel gear relative to said first bevel gear so that in a free state the teeth of said second bevel gear can project relative to the teeth of said first bevel gear in a direction of a rotation axis and so that in a pushed state, when the teeth of said second bevel gear is pushed to the first bevel gear side in the direction of the rotation axis, the teeth of said second bevel gear can be retracted to the first bevel gear side; and a fluctuation suppressing member contacting the second bevel gear for suppressing fluctuation of said second bevel gear relative to said first bevel gear along a predetermined diameter direction.

7. A bevel gear mechanism used for transmitting power between two axes not parallel to each other, said bevel gear mechanism comprising:

a first bevel gear of a ring shape having teeth projecting on one disk surface side;

a second bevel gear of a ring shape arranged to be concentric with said first bevel gear and having teeth placed on a concentric circle basis on the same surface side as the teeth of said first bevel gear;

a support member for substantially restraining rotation of the second bevel gear relative to said first bevel gear and for elastically supporting the second bevel gear relative to said first bevel gear so that in a free state the teeth of said second bevel gear can project relative to the teeth of said first bevel gear in a direction of a rotation axis and so that in a pushed state, when the teeth of said second bevel gear is pushed to the first bevel gear side in the direction of the rotation axis, the teeth of said second bevel gear can be retracted to the first bevel gear side;

a fluctuation suppressing member for suppressing fluctuation of said second bevel gear relative to said first bevel gear along a predetermined diameter direction; and said fluctuation suppressing member is comprised of a pair of plate spring members for holding said second bevel gear and support member on the both sides thereof along the direction of the rotation axis of said bevel gear.

* * * * *